(12) United States Patent
Favero

(10) Patent No.: US 9,975,077 B2
(45) Date of Patent: May 22, 2018

(54) HYBRID APPARATUS FOR DRYING A FLOW OF COMPRESSED GAS

(71) Applicant: PARKER HANNIFIN MANUFACTURING S.R.L., Corsico (IT)

(72) Inventor: Chiara Favero, Perarolo di Vigonza (IT)

(73) Assignee: PARKER HANNIFIN MANUFACTURING S.R.L., Corsico (IT)

( * ) Notice: Subject to any disclaimer, the term of this patent is extended or adjusted under 35 U.S.C. 154(b) by 1051 days.

(21) Appl. No.: 14/109,074

(22) Filed: Dec. 17, 2013

(65) Prior Publication Data

US 2014/0216105 A1    Aug. 7, 2014

(30) Foreign Application Priority Data

Feb. 7, 2013    (IT) .............................. PN2013A0009

(51) Int. Cl.
| | |
|---|---|
| *B01D 53/047* | (2006.01) |
| *B01D 53/04* | (2006.01) |
| *B01D 53/26* | (2006.01) |

(52) U.S. Cl.
CPC ....... *B01D 53/0454* (2013.01); *B01D 53/261* (2013.01); *B01D 53/265* (2013.01); *B01D 53/047* (2013.01); *B01D 53/0423* (2013.01); *B01D 53/0438* (2013.01); *B01D 53/0462* (2013.01); *B01D 2257/80* (2013.01); *B01D 2259/402* (2013.01)

(58) Field of Classification Search
CPC ............ B01D 53/0454; B01D 53/0423; B01D 53/0407; B01D 53/0462; B01D 53/047; B01D 53/265; B01D 53/261

USPC .................................................... 95/118–120
See application file for complete search history.

(56) References Cited

U.S. PATENT DOCUMENTS 3,448,561 A    6/1969 Seibert et al.
7,279,026 B1    10/2007 Fresch et al.

FOREIGN PATENT DOCUMENTS

EP    2 263 778 A1    12/2010

OTHER PUBLICATIONS

Oct. 15, 2013 Search Report issued in Italian Application No. IT PN20130009 (with translation).

(Continued)

*Primary Examiner* — John F Pettitt
(74) *Attorney, Agent, or Firm* — Oliff PLC

(57) ABSTRACT

Hybrid apparatus for drying compressed gas and including an adsorption dryer with first and second columns and an outflow device for the dried gas therefrom, a first diverting device to convey the compressed gas toward and through the first and second columns, a second diverting device to convey toward a downstream connected device the compressed gas coming from the first or second column, in which is arranged the command and control device to implement an adsorption cycle and a regeneration cycle that includes, for each column, an initialization, gas exhausting, regeneration, cooling and pressurization phases, and in which the initialization phase includes the determination of an assigned time within which subsequent phases must be maintained; the regeneration phase including tapping previously heated gas from the first column and feeding it into the second. The apparatus also includes a heating device connected to the second diverting device for the regeneration phase.

9 Claims, 9 Drawing Sheets

(56) References Cited

OTHER PUBLICATIONS

Feb. 7, 2013 Written Opinion issued in Italian Application No. IT PN20130009 (with partial translation).

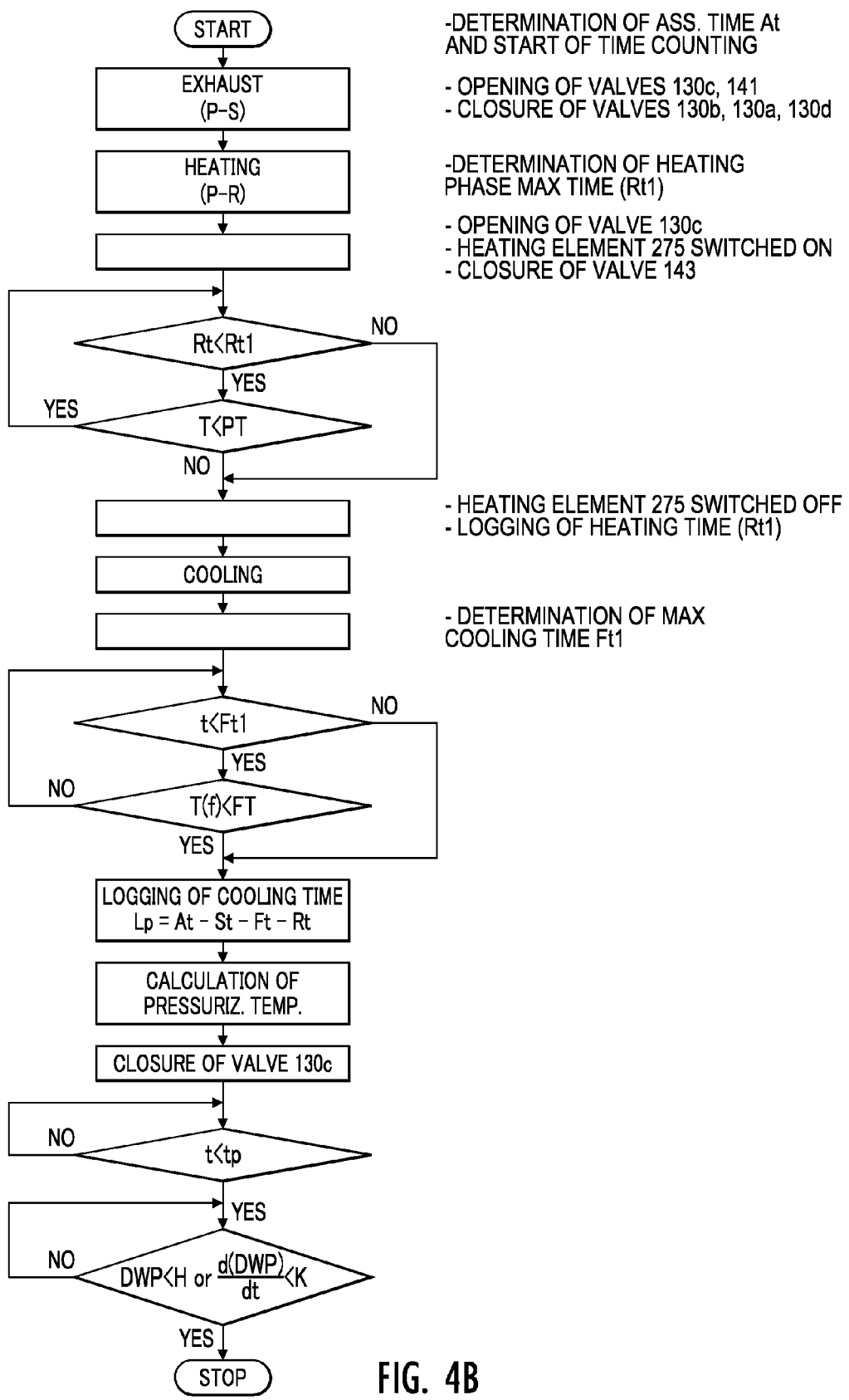

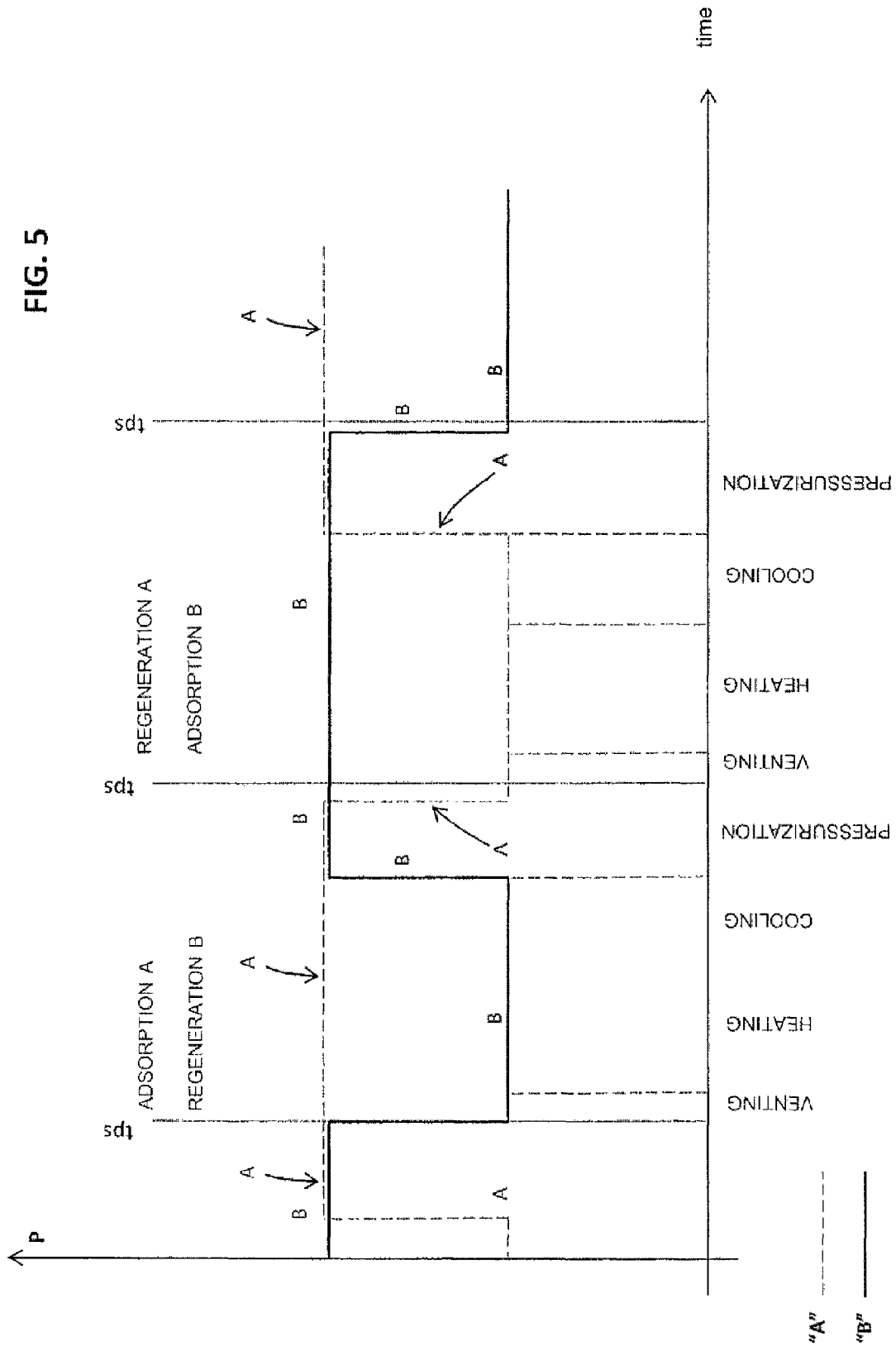

HYBRID APPARATUS FOR DRYING A FLOW OF COMPRESSED GAS

The present invention refers to an improved hybrid apparatus consisting of:
- a first stage for cooling a compressed gas, that is normally compressed air but can also be any other gas that is to be subjected to an extreme drying process;
- a second stage that uses the method of removing the residual humidity through the passage of the compressed air, flowing out of the first stage, through one or more "beds" or columns of adsorbing substances that intercept and capture the residual humidity.

Since the invention is intended in particular for dehumidifying in an industrial context the compressed air drawn from the environment, the following description and the accompanying claims will refer in particular to drying compressed air, although it remains understood that the invention applies in general to any other type of gas.

Normally, said first cooling stage uses as a method for cooling the air (and the consequent removal of the resulting condensation), which will be dehumidified in the subsequent second stage, as will be explained in detail later, the well-known method of making said air flow through the first branch of a heat exchanger, the second branch of which (generally an evaporator) is crossed by a strongly cooled refrigerant.

After one of said columns has performed and completed the moisture adsorption phase, it must be regenerated, which means that it is crossed by a second flow of gas, which is much dryer and at a conveniently high temperature so that it extracts the moisture previously captured by said adsorbing substances and entrains it outside, where the gas is subsequently expelled.

In order to provide continuity in said moisture adsorption process, not only one but two similar columns containing adsorbing substances are used; in essence, the procedure consists of providing alternatively two distinct phases consisting of:
- dehumidifying the gas in a first column and at the same time regenerating the second column;
- subsequently inverting the two columns, in the sense that the compressed gas flowing from the first stage is diverted into the second column to remove the moisture from the respective newly regenerated adsorbing substances, while the first column is crossed by a flow of dry, heated gas so as to be "regenerated" in turn.

Essentially, the apparatus consisting of the two columns of adsorbing material, and the relative connecting ducts from the first stage and toward the using devices, consists of a substantially symmetrical apparatus that works in an alternate and specular manner in its use and operation between said two columns.

This type of apparatus is well known in the art; it is described extensively in EP 2 263 778, U.S. Pat. No. 4,761,968, and U.S. Pat. No. 5,632,802.

The devices described in said patents, although they are certainly effective in achieving the desired results, are however characterized by drawbacks of various nature that consist, basically, of the fact that they are either too costly to manufacture, like for example the devices with hot-type regeneration, or demand a high consumption of compressed air, as is the case with systems with cold-type regeneration.

To overcome these problems, the above-mentioned EP 2 263 778 patent, filed by the applicant hereof, has identified a solution that consists in the construction of a hybrid apparatus, in which the drying stage through two columns of adsorbing material is associated with particular connections between the two columns and toward the outside, and relative operating modes, suitable to maintain the simplicity of the apparatus and at the same time to achieve a significant operating economy.

However, in the course of experimentation and in normal operation numerous improvements and variants were found, at both the construction and operating level, that optimize the performance of the apparatus, and that were not mentioned or described in the above-cited EP 2 263 778.

Hence, the main objective of the present invention is to provide a type of dehumidification apparatus comprising:
- a first stage for cooling and the consequent drying of a gas, typically compressed air, realized according to the prior art,
- and a subsequent dehumidification stage that uses a means suitable for adsorbing moisture, that can be achieved in a simple manner with known materials and methods and that, in particular, can be achieved on the basis of said EP 2 263 778, thus being an improvement thereof.

This objective is achieved by a dehumidifier made according to the enclosed claims.

Characteristics and advantages of the invention will become evident from the description which follows, by way of example and without limitations, with reference to the accompanying drawings, wherein:

FIG. 4B illustrates a symbolic flow diagram that represents the logical sequence of the operations of a variant embodiment of the apparatus according to the invention;

FIG. 5 illustrates a simplified diagram showing the pressure trends in the two columns of the apparatus according to the invention, during a normal operating cycle;

In the description which follows, terms such as "on", "under", "above", below", "lower" and "upper" may be used; an expert in the field will have no problem understanding that such terms refer to the orientation of the apparatus as arranged for normal operation and as shown in the enclosed figures, and therefore these terms, which do not generate uncertainties of interpretation with the expert in the field, are useful to provide clearer and simpler explanations and definitions of the contents of the invention.

Figure 1A:
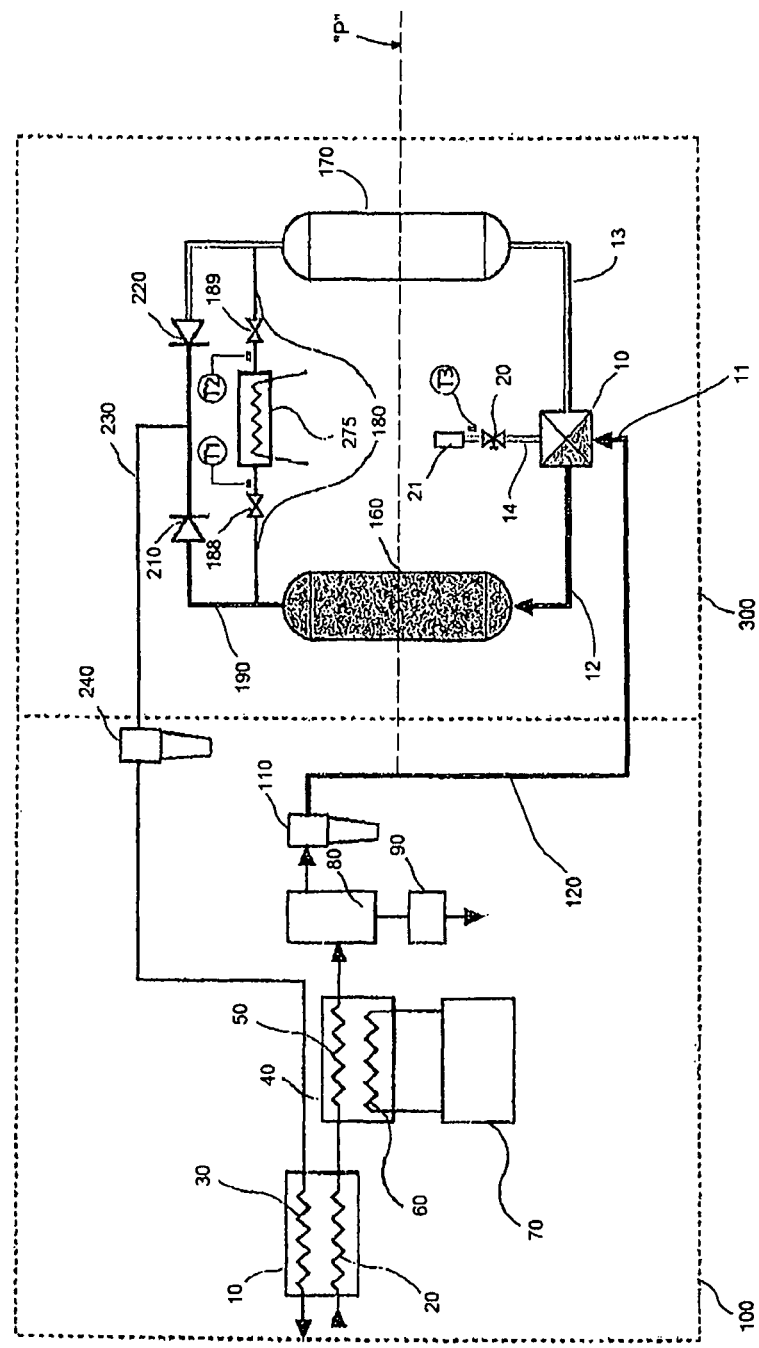
FIG. 1A illustrates a symbolic diagram of a first embodiment of an apparatus according to the invention.

With reference to FIG. 1A, an apparatus is shown for dehumidifying and post-heating a flow of gas, preferably compressed air, made according to the prior art and comprising:
- a first means identified by numeral 100 that performs, on the air to submit to the dehumidification process through adsorption, a first cooling phase and a separation of the resulting condensate as necessary; and
- a second means, generally identified by numeral 300, that performs the desired dehumidification phase through adsorption.

For what concerns said means 100, a fact to bear in mind is that the adsorption process is the most effective, independently of the energy balance, when the air to process is colder and saturated with humidity; in FIG. 1A, said means 100 is symbolically represented by a cooling and dehumidification apparatus of conventional type, that is, by heat exchange in an appropriate heat exchanger fed by a refrigerant, but it remains understood, as already explained above, that such a cooling apparatus, indicated by the means 100, can be any system suitable to cool the flow of compressed air entering into the second means, independently of the nature and functionality of said first means.

Said second means includes:
  a first column 160 and a second column 170 containing adsorbing material and connected to each other through:
  a four-way valve, 10 or equivalent device, wherein.
    a first way 11 is suitable to receive the compressed gas conveyed, through an intake conduit 120, from said refrigeration dryer;
    a second way 12 is suitable to divert the gas received from said four-way valve and to feed it into the lower portion of said first column 160;
    a third way 13 is suitable to divert the gas received from said four-way valve and to feed it into the lower portion of said second column 170;
    a fourth way 14 is suitable to divert the gas received from said four-way valve into a conduit in which are arranged in series:
      a first selectively controllable exhaust valve 20;
      a temperature sensor T3 for the exhaust gas flowing through said fourth conduit;
      an outlet vent 21 opening toward the outside environment.

Thus, said two columns are fed in their lower portions with compressed gas to be dried because, as mentioned, the four-way valve which receives the gas to be dried sends alternatively said gas to the portions arranged in the lower part of the respective columns, as is clearly shown in FIG. 1A.

There is also provided:
  a fifth conduit 180 suitable to connect the two upper portions of said two columns and provided with a heating element 275, and with at least one but preferably two calibrated orifices 188, 189, arranged on said fifth conduit at the opposite sides of said heating element;
  two temperature sensors T1, T2 arranged on said fifth conduit at the opposite sides of said heating element 275,
  a sixth conduit 190 suitable to connect the two upper portions of said two columns and provided with two non-return valves 210, 220 arranged in a direction opposite to each other;
  a seventh conduit 230 that connects the part of said sixth conduit 190 that is located between said respective two non-return valves, to external means 100 that use said dried compressed gas.

With regard to said heating element 275, it must be pointed out that this is not necessarily an electrical heating element (as shown symbolically in the drawing) but it can be any heating means or heating energy carrier that can work at a temperature of T>100° C. or at any rate suitably higher and that can transfer to this temperature a determinate quantity of heat.

According to the invention, the apparatus includes command and control means, not explicitly shown because they are well-known, suitable:
  to alternately implement an adsorption cycle and a regeneration cycle, during which the inflowing compressed gas is possibly drawn from the condensation separator 80 of a refrigeration dryer 100, wherein said regeneration cycle comprises the following phases:
    initialization phase (P-I);
    exhausting phase for the gas from a column (P-S);
    heating phase of the same column (P-R);
    cooling phase (P-F) of the same column;
    pressurization phase of the same column (P-P).

In general, said apparatus has already been briefly described in the above-mentioned EP 2 263 778.

Herein are illustrated and explained some important improvements and enhanced variant embodiments.

Reference will now be made to FIG. 1A, which illustrates a first, simplified embodiment of the invention, and to FIG. 4A, which illustrates symbolically the operation of the same.

In the description which follows, it will be assumed that the term "first column" refers to the column where adsorption is taking place, and the term "second column" naturally refers to the other column INITIALIZATION PHASE: Said initialization phase (P-I) includes the determination of an initial instant and a subsequent assigned time interval At within which the general set of subsequent phases must fall; this requirement is due to the fact that, for operating reasons, each regeneration cycle cannot extend beyond the maximum set time, because otherwise the duration of the corresponding adsorption cycle on the other column could be too long, and could result in evident negative consequences on the drying performance of the gas that flows through said adsorption column.

This maximum time could be extended only with a partial load.

EXHAUSTING PHASE: Said exhaust phase (P-S) comprises the emptying of the second column and the release of the gas from said second column through said third way 13 toward said fourth way 14 and from there to the outside.

For this purpose, said fourth way 14 includes the selectively controllable exhaust valve 20, which is naturally opened during the exhaust phase; this valve is necessary for the purpose of de-pressurizing the column and thereby to make it possible to start the physical de-adsorption of the water particles adsorbed in a previous phase of the drying material.

Said command and control means operate said exhaust phase for a time of predetermined duration St.

HEATING PHASE (P-R): this phase includes the step of drawing or partial tapping of air from said first column and the relative feeding into said second column, in which the air fed into said second column is previously heated.

This regeneration phase is essential for the invention; in fact, the partial drawing of the already dried, though cold, air from the first column, and its subsequent heating guarantees that the second column, which is crossed by said air, is treated with air that is completely dry, and moreover with a minimum energy input, because it is no longer necessary to regenerate the second column with air drawn completely from outside and therefore not very dry, and on the whole scarcely effective.

Therefore, suitable heating means 275 are used on said duct so as to heat the fraction of the compressed, and already dried, air that flows out of the first column 160 and that is in fact diverted through said duct 180 into the second column 170.

In practice, in this manner is created a flow of dried and heated air that flows in countercurrent through the second column 170, which flow in fact achieves the desired regeneration function.

In fact, the effect of regenerating the adsorbing material is more successful the more the regeneration gas, in our case air, is dry and warm.

However, to ensure that only a small fraction of air is drawn from the outflow of the first column so that it can be sent to the second column, in said duct 180 are inserted one or preferably two calibrated orifices 188, 189, arranged preferably at the opposite sides of said heating element 275.

This is to ensure that the structural symmetry of the apparatus also generates a corresponding symmetry of operation in the alternate cycles of adsorption and regeneration.

It is also pointed out that, although said heating element 275 is designed as a conventional electrical heating element, in its general use said element 275 can be any selectively controllable means suitable to provide heat, such as for example a heat exchanger that transmits heat from any available heat source.

However, the temperature of this regeneration gas must not exceed a preset value, for evident reasons of technical and energy consumption nature; and moreover it is also necessary to take into account the limitation due to the fact that the overall time of the regeneration phase must not exceed a preset value Rt, so as not to excessively prolong the regeneration cycle.

To resolve these two limitations, said command and control means are designed so as to actuate the following functions:

switching on or activating said heating element 275;
opening the exhaust valve 20 on said fourth way 14;
operating said four-way valve 10, so that a counter-flow of gas is generated in said regeneration column, with the simultaneous opening of the fourth way 14, which is thus connected to said third way 13;
controlling that the time of operation of said heating element does not exceed a preset time interval Rt1;
if said operating time is longer than said preset time interval Rt1, then said heating element 275 is deactivated;
if said operating time is not longer than said preset time interval Rt1, then a comparison is carried out between:
the temperature measured T by said exhaust gas temperature sensor T3;
and a preset temperature value PT;
if said operating time Rt1 is not longer than said preset time interval, and the temperature measured T by said gas temperature sensor T3 exceeds said preset value PT, then said heating element 275 is deactivated.

Basically, a sequence of operations is carried out that includes two successive comparisons of "IF" type, wherein the first concerns the heating time, and the second concerns the temperature measured by the sensor T3.

Figure 4A:
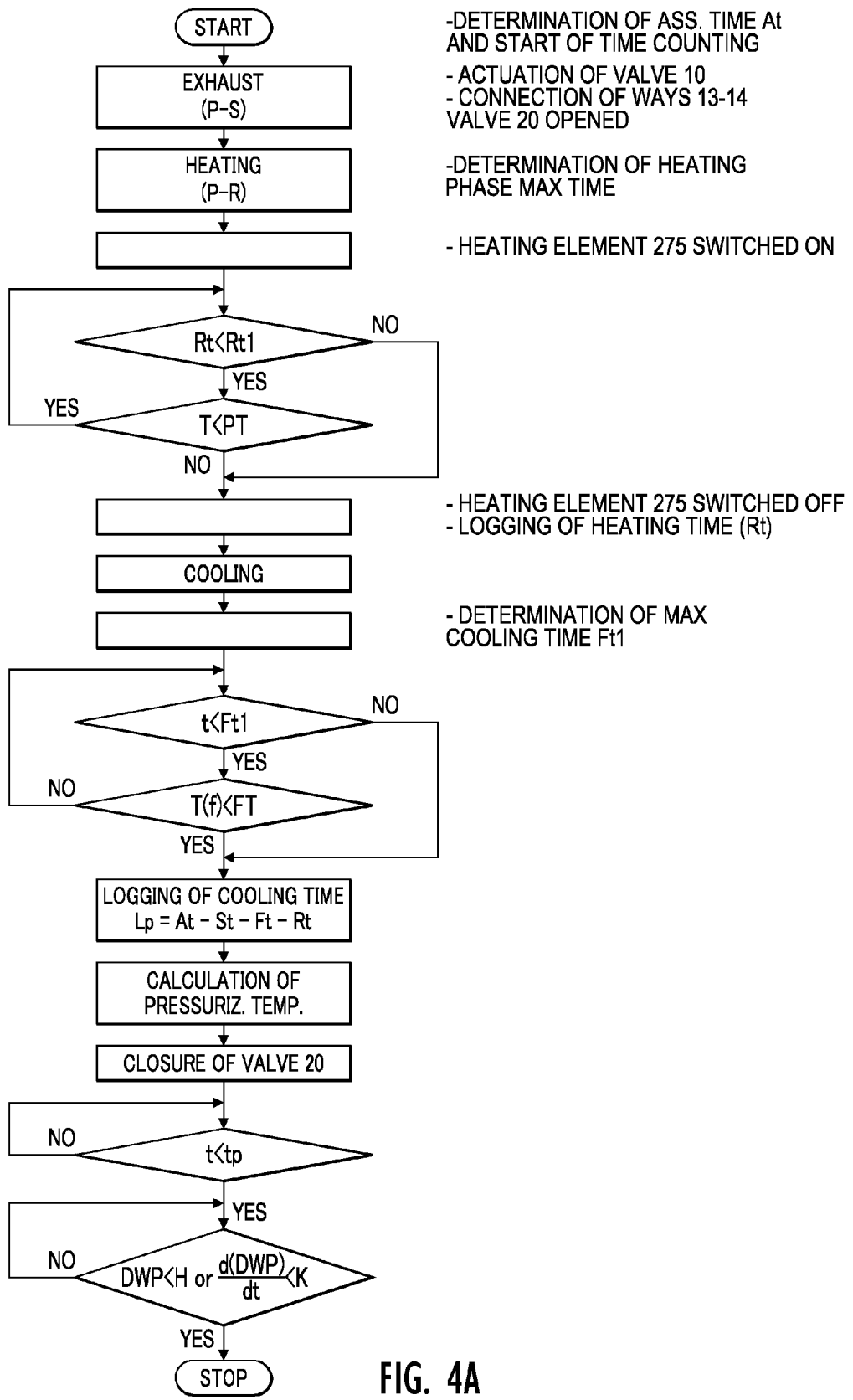
FIG. 4A illustrates a symbolic flow diagram that represents the logical sequence of the operations of an apparatus according to the invention.

The diagram of FIG. 4A illustrates this type of logic and operation in a manner that is self-evident to a person skilled in the field.

It should also be considered that the heating phase could be allowed to have not only a single heating step as the one shown, which stops when the preset time or maximum temperature is reached, but also that it be allowed to have repeated and successive intermediate enabling and disabling phases of the heating element 275 when a preset maximum temperature is reached, until the preset time interval has expired or the preset temperature is reached. However, this variant could be easily inserted by an expert in the field in the diagrams of FIGS. 4A and 4B (which variant will be explained later), and therefore an explicit illustration of the same is omitted.

Here it is briefly explained that said successive intermediate enabling and disabling phases of the heating element 275 are controlled in an automatic mode with reference to predefined set points and on the basis of the temperature detected by said temperature sensors T1 and T2, already illustrated; said automatic control of the activation of said heating element 275 is in itself well-known, and therefore an explanation would be redundant and is omitted.

COOLING PHASE: after having definitively deactivated said heating element 275, the regeneration phase continues for a period in which the compressed gas continues to flow from the first column to the second column but, as it is no longer heated, it will remain cold. The function of said cooling phase has already been described in great detail and with the relative explanations in the already mentioned EP 2 263 778, and therefore for the sake of concision such further description will not be repeated.

The present improvement consists in implementing an operating mode completely similar to the one described for the regeneration phase, in which the subsequent operation of the apparatus depends on a comparison of the temperature measured by the sensor T3 with a predetermined temperature, and on another comparison of the current time, with respect to the cooling phase, as compared with a predetermined time interval.

Thus said command and control means implement the following operations:

check that the operating time from the start of the same cooling phase does not exceed a preset time interval Ft1;
if said operating time is longer than said preset time interval Ft1, then the process passes to the subsequent pressurization phase, and said four-way valve 10 is actuated so as to stop the passage of the gas through said third way 13 toward said fourth way 14;
if said operating time is not longer than said preset time interval Ft1, then the comparison is carried out between:
the temperature T(f) measured by said exhaust gas temperature sensor T3;
and a preset temperature value FT;
if said operating time is not longer than said preset time interval, and the temperature T(f) measured by said gas temperature sensor T3 does not exceed said preset value FT, then the process passes to the subsequent pressurization phase, in which:
said four-way valve 10 is actuated so as to block the passage of the gas through said third way 13 toward said fourth way 14,
and said exhaust valve 20 is closed.

Essentially, in this phase too is implemented a sequence of operations which include two subsequent comparison of "IF" type, in which the first regards the cooling time, and the second regards the temperature measured by the sensor T3.

PRESSURIZATION PHASE: in this phase the second column is re-pressurized so as to make it available for the subsequent adsorption cycle.

The purpose of said pressurization phase is to re-pressurize with cold air the second column, which has just been regenerated.

Once the operating pressure is reached, the column remains in a stand-by state for the remaining pressurization time. Extending the pressurization phase improves the energy balance because there is no consumption of compressed air.

Said phase lasts for a predetermined time interval "Lp", which must logically correspond to the difference:
- between the total time assigned At to the entire regeneration time;
- and the sum of the time intervals St, Ft, Rt spent in the previous exhaust, heating and cooling phases:

$$Lp=At-St-Ft-Rt$$

To that end, it will be evident that, at the end of each of said heating and cooling phases, said command and control means measure and memorize the respective time intervals; this does not happen for the time spent for the exhaust phase, which, as defined above, has a predetermined duration St.

Thus, the duration of the present pressurization phase is also calculated univocally.

At the end of said pressurization phase, the dew point (Dwp) inside the first column is measured; if the Dwp measured is lower than the preset or required value "H", the columns remain stably in their current state.

In particular, in the case described here, the column 160 continues to work in the adsorption mode and the column 170 continues its pressurization phase.

In this manner, the energy economy is improved.

During this phase, the dew point (Dwp) is continually monitored and:
- when said Dwp exceeds said set or required value "H",
- or when the derivative—d(DWP)/dt—with respect to the time of the relative function exceeds a respective preset time "K", d(DWP)/dt>K, then said phase is interrupted.

Figure 1B:
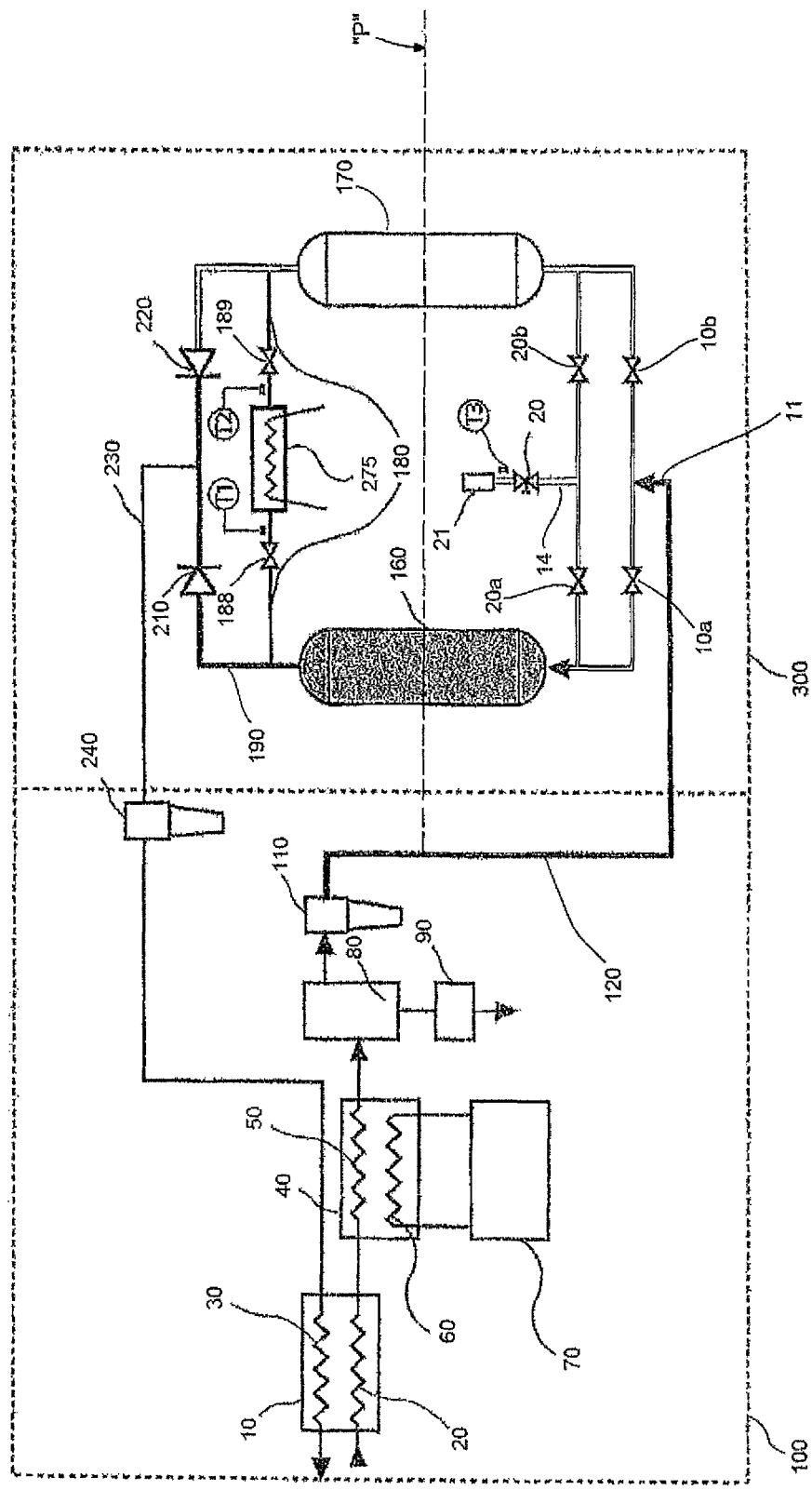
FIG. 1B illustrates a symbolic diagram of a variant embodiment of the apparatus of FIG. 1A.

The structural and functional configuration of FIG. 1A can also be advantageously modified as shown in FIG. 1B, in which the single four-way valve 10 is replaced by four single valves 10a, 10b, 20a, 20b, and by the relative connections between them, and between them and the two columns 160, 170.

It will be clearly evident to a person skilled in the art that said four single valves 10a, 10b, 20a, 20b can be operated in a coordinated mode, by appropriate command and control means not shown, so that said single valves 10a, 10b, 20a, 20b perform exactly and selectively the same connections obtained with the operation of said single four-way valve 10; this configuration in fact results from the functional point of view to be a simple equivalent of the configuration shown in FIG. 1A, but it differs from it for its greater structural simplicity and a consequent reduction of the construction and control costs.

The solutions that have just been described have proved to be advantageous and effective; however, during testing they evidenced an effect that in certain conditions can lead to a specific drawback; this consists of the fact that when the inflowing compressed air enters from below in said columns, if the speed of the air is too high it gives rise to a "boiling" effect or "fluidization" of the bed, or undesirable stirring of the adsorbing material contained therein.

This stirring naturally causes a friction of the material itself, and therefore a partial pulverization of the same, and basically the particles of pulverized material are carried off with the same current of compressed gas, thus generating very serious problems that are well known to an expert in the field.

Figure 2:
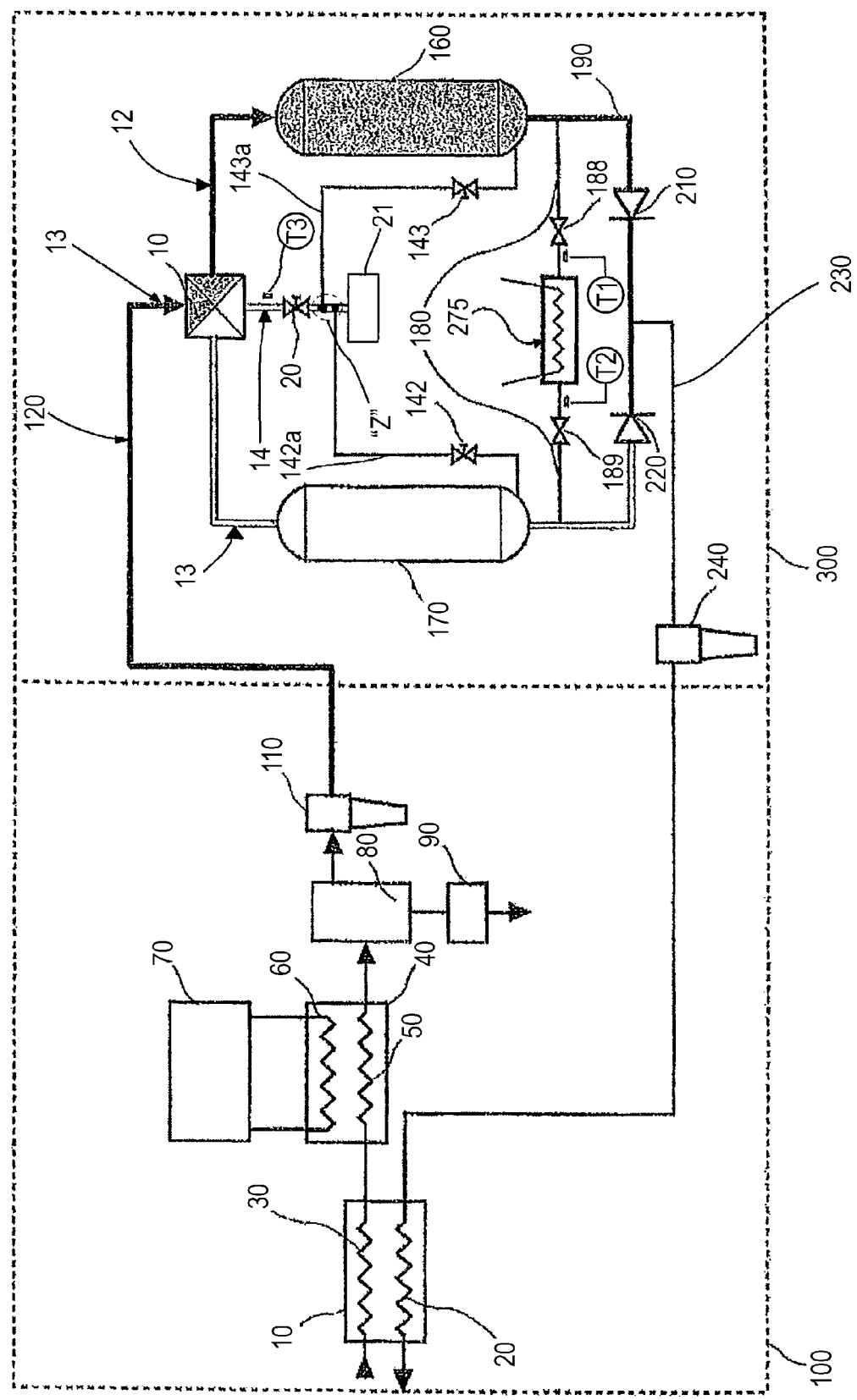
FIG. 2 illustrates a symbolic diagram of a second embodiment of an apparatus according to the invention.

To avoid this situation, the present improvement teaches to "upend" the apparatus as described, so that now, as shown in FIG. 2, the two columns 160 and 170 are fed with compressed air from above, while obviously the exhaust air, after drying, flows out through the bottom.

In practice, FIG. 2 corresponds to FIG. 1A wherein this figure is turned upside down 180° around a horizontal plane (p) (see FIGS. 1A and 1B) that bisects said two columns.

Thus, not only is the relative operation completely identical, and therefore the working arrangement of FIG. 4A is also applied for the apparatus of FIG. 2, save for a difference that will be explained below, but also the problem referred to above does not arise any more because the material is now compressed downward, where it has already settled by gravity.

However, this second embodiment could engender a relative problem of its own, due to the fact that during the exhaust phase the compressed gas present at the bottom of the second column would have to be vented upward from below at a high speed (due to the pressure drop), with the consequent stirring of the adsorption bed.

Thus, to eliminate said drawback, an advantageous improvement is to introduce a respective venting conduit provided with a respective selectively controllable valve 142, 143, which vent into the fourth conduit 14 as is clearly shown in FIGS. 2 and 3 (which will be immediately explained below).

Thus, to avoid said drawback, said two exhaust valves are opened only during said exhausting phase (P-S), and are kept closed for any other interval of time.

Figure 3:
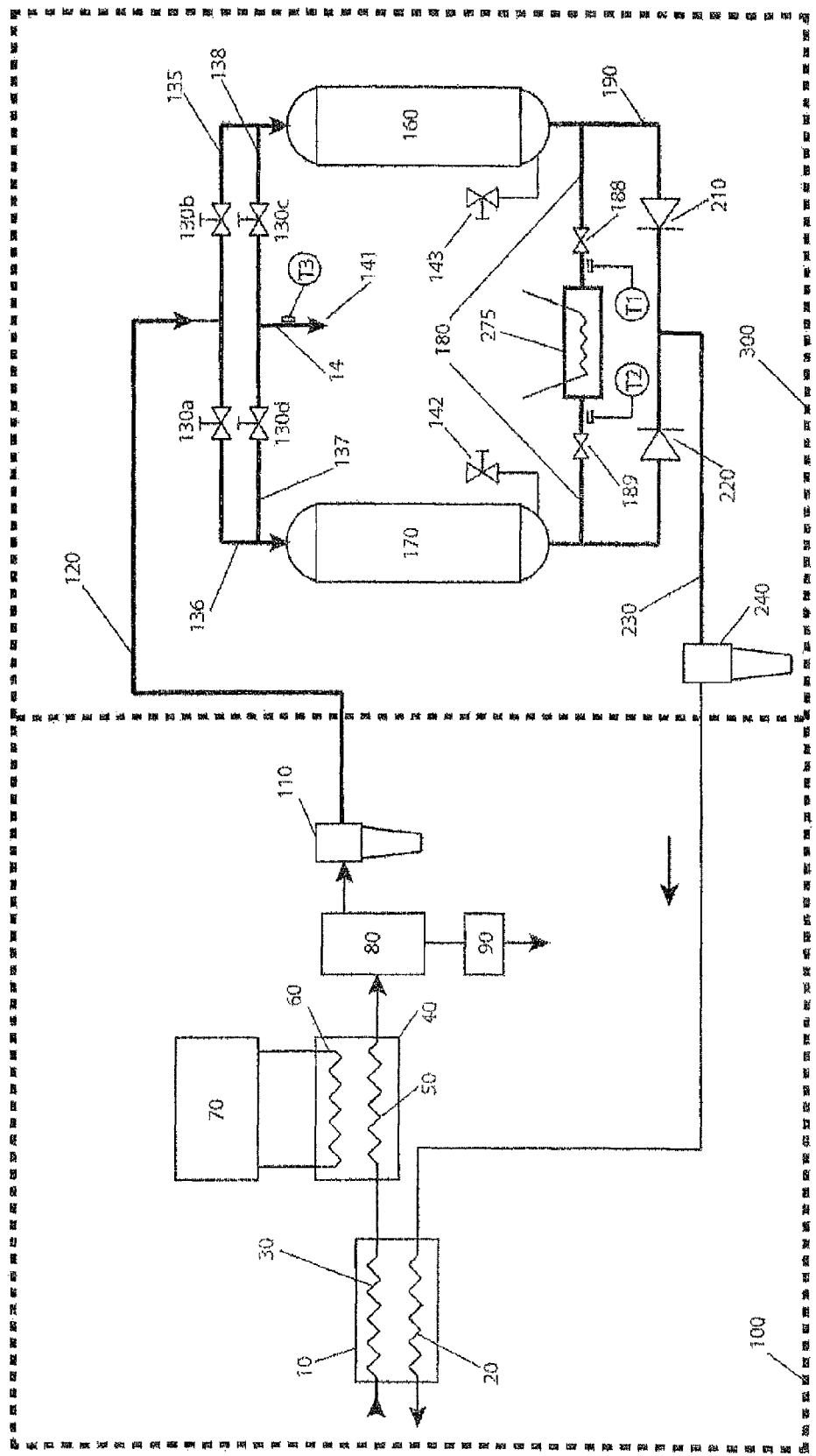
FIG. 3 illustrates a symbolic diagram of a third embodiment of an apparatus according to the invention.

With reference to FIG. 3, a further advantageous embodiment of the invention is shown: it corresponds substantially to the apparatus of FIG. 2, with the only difference being that the relative four-way valve and the relative conduits which branch off from this toward the two columns and toward said exhaust conduit 14 are replaced by a quadrilateral arrangement of conduits in which each side includes a respective selectively controllable shut-off valve 130a, 130b, 130c, 130d, and an end of said four conduits leads to a respective column.

The fundamental purpose of said variant embodiment consist of the fact that the construction and the control of said four valves is much simpler and more economical than the control of the four-way valve 10.

Thus, in FIG. 3 the configuration is completely evident; in fact, said apparatus of FIG. 3 includes:
- a first column 160 and a second column 170 provided with:
  - a respective top part in which is arranged the infeed of the compressed gas to be dehydrated;
  - and a respective bottom part in which is arranged the respective outflow of the dried compressed gas,
  in which said columns are connected, in their respective top part, by a respective first conduit 135, 136 in which are arranged two selectively controllable shut-off valves 130c, 130d, and between which is arranged an exhaust conduit 14 which includes a temperature sensor T3 for the exhaust gas flowing through said exhaust conduit;
- an outflow 14 opening to the outside environment;
- and in which said columns are connected, still in their respective top part, by a second conduit 137, 138 in which are arranged two other selectively controllable shut-off valves 130a, 130b; as can be seen, in FIG. 3 is not present the equivalent of the valve 20 on the fourth way 14; this is explained by the fact that the corresponding closing/opening function is provided by a relative open/close control on said two valves 130c and 130d;

and in which said columns are connected, in their respective bottom part, by a third conduit 180 in which are arranged:

a heating element 275;

and respective two calibrated orifices 188, 189 arranged at opposite sides of said heating element;

two venting valves 142, 143 arranged respectively on respective exhaust conduits that connect the internal bottom portions of respective said columns 160, 170, and in which said columns are connected, still in their bottom part, by a fourth conduit 190 on which are installed two non-return valves 210, 220 arranged in opposite directions and between which is connected the outflow conduit 230 of dried compressed gas.

It can be seen that in the two distinct and respective FIGS. 2 and 3 is used a different form of installation of said two exhaust valves 142 and 143; in fact, in FIG. 2 the two exhaust valves 142 and 143 are arranged in respective exhaust conduits 142A and 143A, which independently converge and drain into the fourth way 14, at the zone identified as "Z" downstream of the valve 20, which obviously remains closed.

The purpose of said form of configuration is to utilize for both columns during the pressurization phase the same silencer 21 that is also used in the exhaust phase when the valve 20 is opened.

Conversely, in FIG. 3 said two valves 142, 143 vent directly to the environment.

The expert in the field can now easily understand that the operation of this apparatus is completely identical to the operation of the apparatus of FIG. 2, since the four selectively controllable valves 130a, 130b, 130c, 130d and the respective conduits can be controlled so as to perform in an absolutely faithful and equivalent manner the same operations and connections as described with reference to the apparatuses of FIGS. 1A and 2.

Thus a detailed description of the same will be omitted, trusting that an expert reader will have no problem recreating exactly the operation of said valves and of the relative conduits to thereby repeat the corresponding functions clearly described for the apparatus of FIG. 2.

Basically, the apparatus of FIG. 3 is substantially a technical equivalent of the apparatus of FIG. 2, as the four-way valve is completely replaced in its functions by said selectively controllable four-way valves 130a, 130b, 130c, 130d and the respective conduits 135, 136, 137, 138.

The flow diagram illustrating the operation of the apparatus of FIG. 3 is shown in FIG. 4B; it can be readily seen that the difference between FIG. 4A and FIG. 4B consists in the replacement of the valve 10 with the valves 130a, 130b, 130c, 130d and, in FIG. 4B, in the use of the valves 142 and 143.

For a clearer understanding, and to complete the previous explanations, FIG. 5 illustrates the pressure trends on the basis of time, in which one of the graphs, for example the broken-line graph identified as "A", shows the pressure trend in one column and the other graph, shown as a solid line indicated with "B", shows the pressure trend in the other column In particular, the graph suitably indicates, in abscissa and therefore as a function of time, the four basic phases that make up the regeneration cycle, that is:

interval of time in the exhaust phase;

interval of time in the heating phase;

that is, the interval of time in the cooling phase;

that is, the interval of time in the pressurization phase.

It can be seen that at the end (tps) of this last pressurization phase the two columns exchange their respective operating modes, in other words, at the "Tps" instants starts the exhaust phase in the column that was previously in the pressurization phase.

It can also be seen that, considering the two graphs in combination, there is always an interval of time in which the pressure is at the maximum level, and this demonstrates that, through the combined operation as described of the two columns, there is always generated a flow of "product air" that is continuous since, as the production of this flow of "product air" from one column ends, the supply of the flow of "product air" is drawn automatically from the other column.

FIGS. 6 to 9 show a like number of schematic illustrations of respective variants of the portion of apparatuses from the downstream side of said columns, that is from the side of said columns out of which flows the compressed and dehydrated gas produced therein.

These configurations differ solely in the nature and arrangement of the components involved, and in the respective connections between them, between them and said columns, and toward the outlet conduit.

In fact, in said figures are shown some of said outlets. It will be plain to a person skilled in the field that, by suitably arranging the opening and closing sequences of the valves shown in each embodiment, it becomes completely possible to implement the programmed cycles, wherein, to an adsorption phase in one column can be made to correspond a regeneration phase in the other column, during which it is possible to "tap" a limited quantity of dehydrated air coming from the adsorption column and to feed it, after passing it through a heating element, into the other column located in the regeneration cycle.

Figure 6:
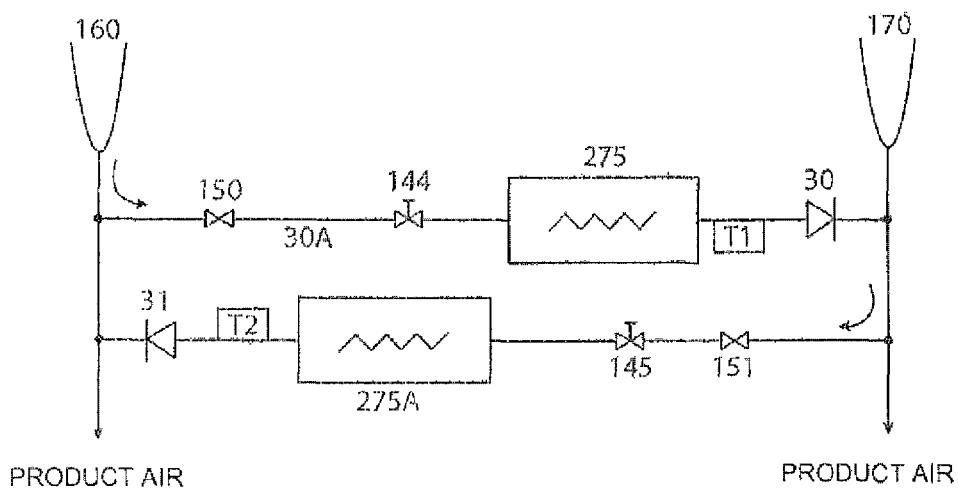
FIGS. 6 to 9 illustrate respective variant embodiments of a portion of the apparatus according to the invention.
Figure 7:
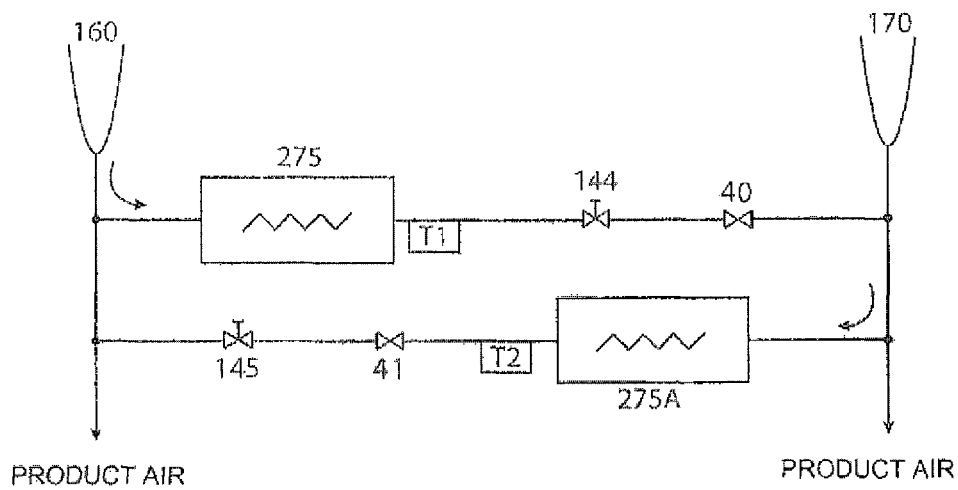

It can be seen that between FIGS. 6 and 7 there is just the difference that FIG. 6 shows two non-return valves 30, 31, which are omitted in FIG. 7; this different configuration is explained by the fact that, in the case of FIG. 6, the flow of cold air on the cold air circuit 30A would cause, when the heating element 275 is operated, a flow of air through the orifice 150 that is always and in any case cold, even when the heating element 275 is operating, this being simply due to the fact that said heating element 275 is located downstream of the orifice 150.

Therefore, it is necessary to prevent the passage of product air from the second column 170 to the first column 160 through said conduit 30A in each situation.

A completely different circumstance is found in the case of FIG. 7, wherein both the shut-off valves 144, 145 and the two orifices 40, 41 are arranged downstream of the heating elements 275, 275a installed on respective distinct branches; in such circumstances, in fact, said orifices can be crossed by both cold air and hot air, and this difference is fundamental to determine the working conditions of the whole apparatus.

Figure 8:
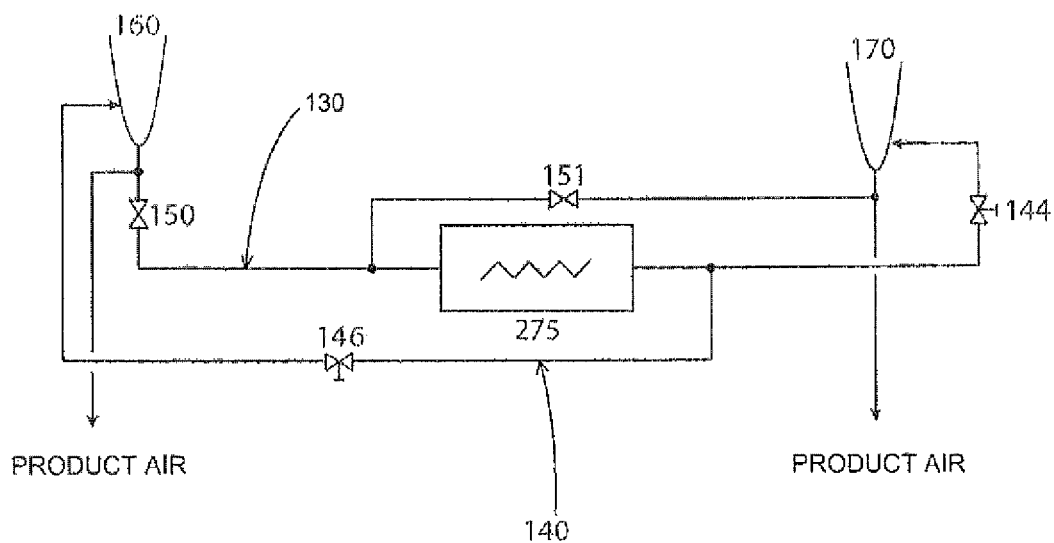

FIG. 8 illustrates an embodiment in which there is a single heating element 275, which however is connected so that it can be used in both operating modes, in which, that is:

the column 160 is in the adsorption mode, and one part of the flow of compressed air, suitably adjusted by the orifice 150 on a respective conduit 130 crosses the heating element 275 and, through a further conduit on which is arranged a selectively closable valve 144, it enters into the bottom of the second column 170; this configuration is completely symmetrical, and therefore a further description is avoided.

It should be observed that, for example in the adsorption phase on column 160 and in the heating phase in column 170, the dehumidified compressed air is prevented from passing directly from column 160 to column 170, that is, without passing through the heating element 275 (regardless of whether this heating element is or is not activated), by the closure of the valve 146 installed on the conduit 140; and the same applies in the opposite case in which it is the column 170 that is in the adsorption phase.

Figure 9:
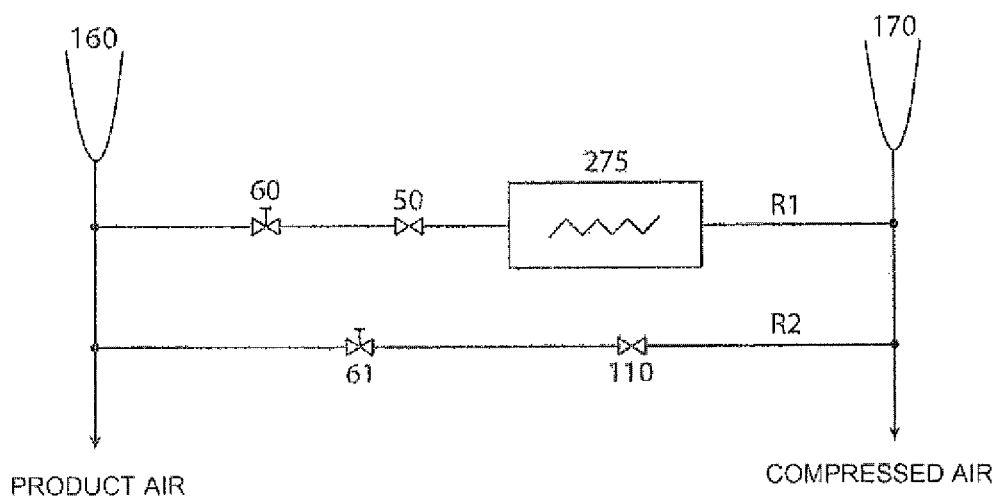

On the other hand, FIG. 9 reflects to a certain extent the configuration of FIG. 7, in which there are two parallel arms R1 and R2. However, one of the two heating elements is eliminated, and the only remaining heating element is used with the compressed air flow that is allowed to flow through it in both directions. The two orifices 50 and 110 are used to adjust the gas flow in the two directions, and in particular the conduit R2 is used when wishing to avoid the passage of the gas flow through the heating element 275; in this case, a suitable command on the two valves 60 and 61 makes it possible to have this operating mode.

However, each of said embodiments has characteristics in common with every other embodiment, said common characteristics being:
- the presence of two parallel branches between the outflows of the two columns 160, 170;
- the presence of at least one branch of a heating element 275 that can be selectively deactivated;
- the presence in series, on the branch that contains said heating element, of also at least one calibrated orifice, and of a selectively enabled shut-off valve 60 or 144 (145), in which, based on the operating mode, the valves 144 and 145 swap their respective functions;
- the presence, on the other branch, of a second selectively controllable shut-off valve 61 (FIG. 9) and 146 (FIGS. 6, 7).

The invention claimed is:

1. A hybrid apparatus for drying a flow of compressed gas, comprising:
   a first stage comprising a refrigeration de-hydrator means configured to pre-cool the compressed gas flow, and of removing condensed liquid;
   a second stage that is arranged downstream of the first stage, the second stage comprising: two columns, each of the two columns containing an adsorbing means and being connected to each other through:
      a first conveying means configured to convey the compressed gas from the first stage to a first opening of a first column;
      a first diverting means that is arranged on the first conveying means and that is configured to divert the compressed gas coming from the first stage towards a first opening of a second column of the two columns;
      a second conveying means configured to convey the compressed gas, which is now de-hydrated gas, from a second opening of the first column to a second opening of the second column, wherein the first opening of the first column is arranged at either a lower portion or an upper portion of the first column, and the second opening of the first column is arranged at the other of the lower portion and the upper portion of the first column; and
      a second diverting means that is arranged on the second conveying means and that is configured to divert the compressed gas coming from the second opening of the first column to a heating element; and
   command and control means programmed to alternately implement an adsorbing cycle and a regeneration cycle, wherein
   the regeneration cycle comprises the following phases:
      an initialization phase comprising a determination of an assigned overall time length in which the regeneration cycle must not exceed,
      an exhaust phase comprising exhausting of the second column,
      a heating of the second column phase comprising:
         activating the heating element,
         activating the second diverting means so that a counter-current gas flow is generated inside the second column,
         checking the operating time of the heating element with respect to a pre-determined heating element time interval,
         if the operating time of the heating element is longer than the predetermined heating element time interval: de-activating the heating element, and
         if the operating time of the heating element is not longer than the predetermined heating element time interval:
            comparing a temperature of exhausting gas measured by a temperature sensor with a predetermined temperature value, and
            if the temperature of the exhausting gas measured by the temperature sensor exceeds the predetermined temperature value: disconnecting the heating element, such that the heating of the second column phase comprises at least a portion of the gas from the first column being heated by the heating element, and then conveyed into the second column, the heating element being arranged and positioned for heating the gas in the second conveying means and being configured to be actuated during the heating of the second column phase, wherein if the operating time of the heating element is longer than the assigned overall time length the heating element is deactivated,
      a cooling phase comprising cooling of the second column, and
      a pressurization phase comprising pressurization of the second column,
   the cooling phase includes the following operations:
      after de-activating the heating element, checking the operating time of the cooling phase with respect to a pre-defined time interval,
      if the operating time of the cooling phase is longer than the pre-defined time interval: stopping the cooling phase by closing at least one exhausting valve of the second diverting means, and
      if the operating time of the cooling phase is not longer than the pre-defined time interval, and the temperature measured by the temperature sensor does not exceed a pre-defined value, stopping the cooling phase by closing the at least one exhausting valve of the second diverting means, and
   the command and control means perform the following operations after closing of the at least one exhaust valve in the second diverting means:
      (i) determining a pressurization time interval (Lp) applicable to the successive pressurization phase as Lp-At-St-Rt-Ft, where At is the assigned overall time length, St is a pre-defined time interval of the exhaust phase, Rt is the operating time of the heating phase, and Ft is the operating time of the cooling phase, and (ii) at the end of the pressurization time interval (Lp): measuring and monitoring a Dew point (Dwp) inside of the second column, and a variation speed [d(DWP)/dt] with respect to time of the Dew point (Dwp) inside of the second column, comparing the variation speed [d(DWP)/dt] with a predetermined value (K), and causing the pressurization phase to continue until the variation speed [d(DWP)/dt] is higher than the predetermined value (K).

2. The apparatus according to claim 1, wherein the first diverting means comprises: a four-way valve or a plurality of valves connected and controlled for equivalent functions of the four-way valve, with:

a first way which is able to receive the compressed gas conveyed, through a first conduit from the first phase, a second way which is able to divert the gas received from the four-way valve or the plurality of valves connected and controlled for equivalent functions and to convey the gas into the lower portion of the first column, a third way which is able to divert the gas received from the four-way valve or the plurality of valves connected and controlled for equivalent functions to the lower portion of the second column, a fourth way which is able to deviate the gas received from the four-way valve or the plurality of valves connected and controlled for equivalent functions towards and into a second conduit having in series:
an exhausting valve which is selectively controllable,
the temperature sensor, which is for the exhaust gas passing through the second conduit, and
an outlet mouth to an outer room, and the second diverting means comprises:
a third conduit able to connect the second openings of the two columns, the third conduit being provided with the heating element,
at least one calibrated orifice arranged on the third conduit at a side that is other the than the side of the heating element,
a fourth conduit able to convey gas from the first openings mouths of the two columns, the fourth conduit being provided with two no-return valves oriented in the opposite sense, and
a fifth conduit connecting a portion of the fourth conduit, which is positioned between the respective two no-return valves, to outer means for using the compressed de-hydrated gas.

3. The hybrid apparatus according to claim 1, further comprising: two breather valves arranged on breather pipes, and configured to connect to the lower portion of the first column, and the lower portion of the second column, respectively.

4. The apparatus according to claim 1, wherein the first column and the second column are each provided with:
the upper portion in which the first opening for inlet of the compressed gas, to be de-hydrated, is arranged, and the lower portion in which the second opening for outlet of the compressed and de-hydrated gas is arranged, the two columns are connected, in the upper portions, by a first conduit in which two selectively controllable blocking valves are arranged, and in between the two columns, an exhausting conduit is connected, which comprises a temperature sensor for the exhaust gas passing across the exhausting conduit, to an outer mouth to an outer room, the two columns are connected, in the upper portions, by a second conduit in which another two blocking, and selectively controllable valves, are positioned, the two columns are linked, in the lower portions, by a third conduit in which is arranged: a heating means, two temperature sensors positioned on opposite sides of the heating means, two calibrated orifices respectively placed on opposite sides of the heating means, two breather valves respectively placed on breather conduits which connect the outer room to the lower portions of the two columns, and the two columns are connected, in the lower portions, by a fourth conduit into which two no-return valves are mounted, which are oriented in the opposite sense, between which an outlet conduit for letting out the compressed de-hydrated gas is connected.

5. The apparatus according to claim 3, wherein the command and control means are further programmed to:
open at least one of the breather valves, implementing the exhausting phase of the gas contained inside the second column before the heating of the second column phase, and
carry out the exhausting phase within a pre-defined time interval.

6. The apparatus according to claim 1, wherein the first diverting means comprises: a four-way valve.

7. The apparatus according to claim 1, wherein the two columns include the following common features:
the presence of two parallel branches between the second openings of the two columns,
the presence in at least one of the two parallel branches of the heating element which is selectively de-actionable, in series to at least a calibrated orifice, and a first selectively actionable blocking valve, and
the presence, on the other of the two parallel branches, of a second selectively actionable blocking valve.

8. The apparatus according to claim 1, wherein one or the other of:
(1) the first openings of the two columns are arranged at the lower portions of the two columns, and the second openings of the two columns are arranged at the upper portions of the two columns, or
(2) the first openings of the two columns are arranged at the upper portions of the two columns, and the second openings of the two columns are arranged at the lower portions of the two columns.

9. The apparatus according to claim 1, wherein the first diverting means comprises a four-way valve, and the hybrid apparatus further comprises two breather valves arranged in respective exhaust conduits, which independently converge and drain into a fourth way which is able to deviate the gas received from the four-way valve.

* * * * *